United States Patent
Ando

(10) Patent No.: US 7,886,100 B2
(45) Date of Patent: *Feb. 8, 2011

(54) INFORMATION PROCESSING APPARATUS AND SMI PROCESSING METHOD THEREOF

(75) Inventor: Motoaki Ando, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/240,175

(22) Filed: Sep. 29, 2008

(65) Prior Publication Data

US 2009/0037630 A1 Feb. 5, 2009

Related U.S. Application Data

(63) Continuation of application No. 11/190,956, filed on Jul. 28, 2005, now Pat. No. 7,447,819.

(30) Foreign Application Priority Data

Jul. 28, 2004 (JP) ............... 2004-220744

(51) Int. Cl.
*G06F 13/00* (2006.01)
*G06F 13/24* (2006.01)

(52) U.S. Cl. ..................... 710/260; 710/268

(58) Field of Classification Search ......... 710/300, 710/340, 260–269, 305–306; 713/300, 340

See application file for complete search history.

(56) References Cited

U.S. PATENT DOCUMENTS

| | | | |
|---|---|---|---|
| 5,551,044 | A | 8/1996 | Shah et al. |
| 5,862,389 | A | 1/1999 | Kardach et al. |
| 5,937,200 | A | 8/1999 | Frid et al. |
| 6,154,846 | A | 11/2000 | Arai |
| 6,446,153 | B2 | 9/2002 | Cooper et al. |
| 6,678,830 | B1 | 1/2004 | Mustafa et al. |
| 6,959,398 | B2 * | 10/2005 | Shah et al. ............ 713/600 |
| 7,170,498 | B2 | 1/2007 | Huang |
| 2004/0010647 | A1 | 1/2004 | Chheda et al. |
| 2005/0172061 | A1 * | 8/2005 | Ushigami ............ 710/301 |

FOREIGN PATENT DOCUMENTS

| | | |
|---|---|---|
| JP | 2-230356 | 9/1990 |
| JP | 09-237246 | 9/1997 |

(Continued)

OTHER PUBLICATIONS

Japanese Office Action dated Apr. 13, 2010 for Appln. No. 2004-220744.

*Primary Examiner*—Mark Rinehart
*Assistant Examiner*—Trisha Vu
(74) *Attorney, Agent, or Firm*—Pillsbury Winthrop Shaw Pittman, LLP

(57) ABSTRACT

An information processing apparatus includes: a CPU; a controller including a signal transmission unit configured to supply an SMI (system management interrupt) signal to the CPU; a multifunctional device having a plurality of functions each potentially causing an SMI; and a plurality of signal lines provided between the controller and the multifunctional device. Each of the signal lines corresponds to one of the plurality of functions and is configured to send a notification of occurrence of an SMI event from the multifunctional device to the controller.

17 Claims, 4 Drawing Sheets

FOREIGN PATENT DOCUMENTS

| | | |
|---|---|---|
| JP | 10-240367 | 9/1998 |
| JP | 11-73330 | 3/1999 |
| JP | 11-102338 | 4/1999 |
| JP | 2001-526809 | 12/2001 |
| JP | 2002-99429 | 4/2002 |
| JP | 2002-175262 | 6/2002 |
| JP | 2003-122583 | 4/2003 |
| WO | WO 2004/040462 | 5/2004 |

* cited by examiner

INFORMATION PROCESSING APPARATUS AND SMI PROCESSING METHOD THEREOF

This is a continuation of U.S. patent application Ser. No. 11/190,956, filed on Jul. 28, 2005, which, in turn, relies for priority on Japanese Patent Application No. 2004-220744 filed Jul. 28, 2004, the contents of both of which are incorporated herein by reference in their entireties.

BACKGROUND OF THE INVENTION

1. Field of the Invention

This invention relates to an interrupt handling technique of an information processing apparatus such as a personal computer.

2. Background Art

In recent years, various types of personal computers such as a desktop personal computer and a notebook personal computer have come into widespread use. In this kid of personal computer, various programs are executed in sequence for each predetermined processing unit; interrupt management is conducted to interrupt the processing being executed and execute processing with higher priority. SMI (system management interrupt) is available as one interrupt management.

The SMI is an interrupt for causing BIOS (basic input/output system) to perform system proper processing (SMI processing) when a predetermined event (SMI event) occurs in the system; the SMI is started as an SMI signal is supplied to a CPU. (For example, refer to U.S. Pat. No. 6,446,153).

Accordingly, it is made possible to perform flexible operation control in such a manner that the processing mode is instantly switched from usual processing of an application program to special processing of the system in response to pressing a function key on a keyboard, for example.

By the way, recently it has been a common practice to install an SMI signal line for supplying an SMI signal to a CPU in a controller for interconnecting system buses (south bridge (SB)) because the controller is provided with a timeout notification function, etc., and the timeout is defined as an SMI event. Therefore, a notification of SMI event occurrence from an embedded controller (EC) is transmitted via the controller to the CPU.

On the other hand, recently the embedded controller has been a multifunctional device having both a power supply controller function and a keyboard controller function, for example, and each function can become the cause of an SMI. Accordingly, it becomes necessary for a BIOS processing section of BIOS operated when an SMI signal is supplied to the CPU to not only access the south bridge, but also access the embedded controller to determine the SMI cause. The reason is that the south bridge cannot determine the SMI event associated with which function has occurred although the south bridge can determine that a notification is received from the embedded controller. However, the embedded controller is connected to a low-speed system bus at a comparatively low stage with respect to the system and thus the responsivity of SMI processing performed by the BIOS is degraded.

BRIEF DESCRIPTION OF THE DRAWINGS

The present invention may be more readily described with reference to the accompanying drawings.

DETAILED DESCRIPTION OF THE EMBODIMENTS

Referring now to the accompanying drawings, there is shown a preferred embodiment of the invention.

Figure 1:
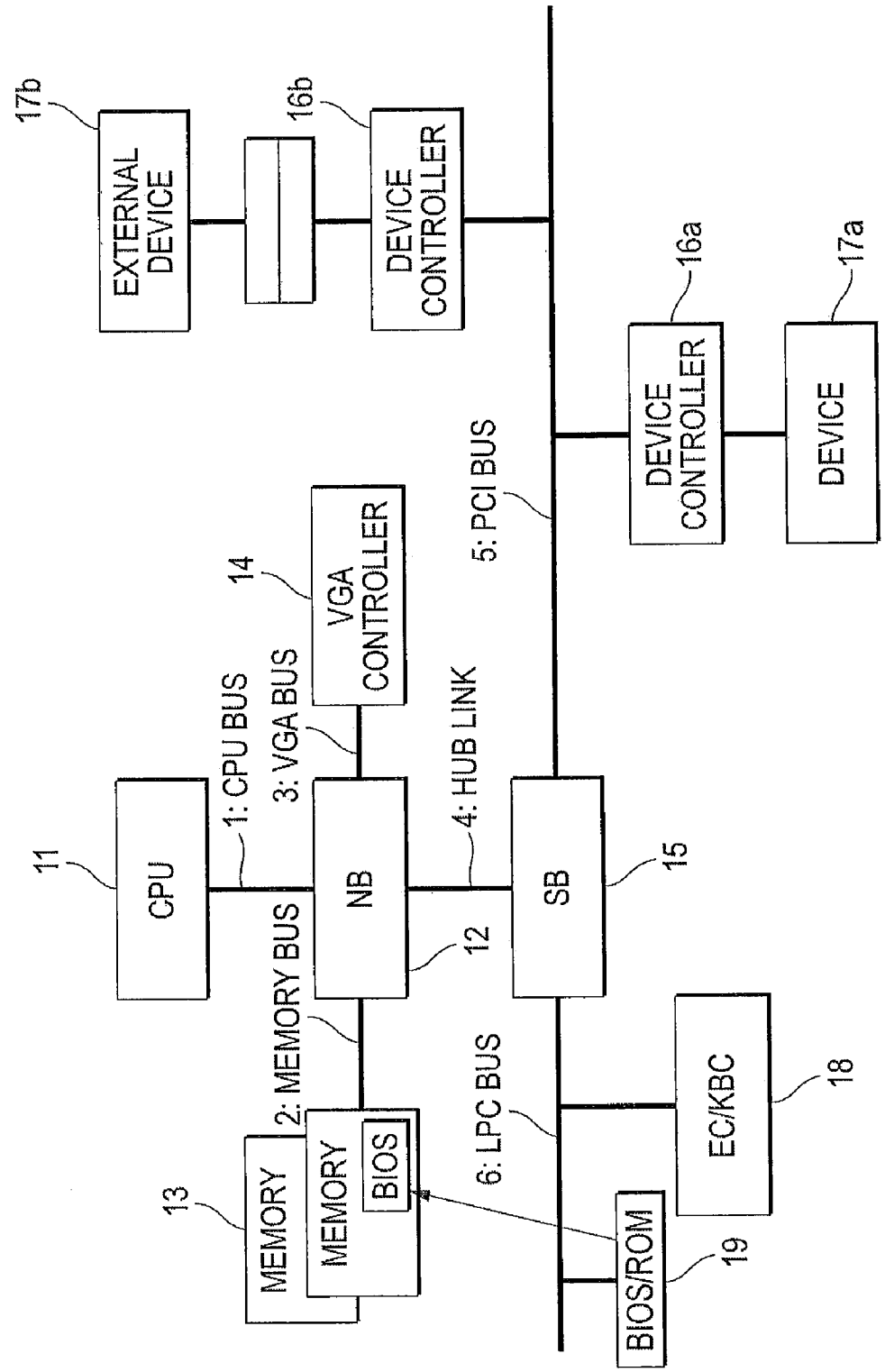
FIG. 1 is a block diagram to show the schematic configuration of a computer according to an embodiment of the invention.

FIG. 1 is a block diagram to show the schematic configuration of a computer according to an embodiment of the invention. The computer is a notebook personal computer that can be operated with a battery, for example, and a CPU bus 1, a memory bus 2, a VGA bus 3, a hub link 4, a PCI bus 5, and an LPC bus 6 are laid as shown in FIG. 1.

An NB (north bridge) 12 is connected to a CPU 11 for controlling the whole computer via the CPU bus 1. The NB 12 is a controller for connecting the CPU bus 1, the memory bus 2, the VGA bus 3, and the hub link 4, and controls comparatively high-speed devices such as memory 13 and a VGA controller 14.

An SB (south bridge) 15 connected to the NB 12 via the hub link 4 is a controller for connecting the hub link 4, the PCI bus 5, and the LPC bus 6 and controls comparatively low-speed devices such as device controllers 16a and 16b, an EC/KBC 18, and a BIOS-ROM 19. The SB 15 has a timer function and can send a timeout notification to the CPU 11 every specified time, for example. To make a notification of the timeout as SMI event occurrence, the SB 15 is provided with an SMI signal line to connect to the CPU 11. The device controller 16a controls an incorporated device 17a and the device controller 16b controls an expansion-type external device 17b.

The EC/KBC 18 is a multifunctional device having both a function of transmitting keyboard operation to the CPU 11 and a function of controlling a power supply control circuit and a battery. These two functions can become each the cause of an SMI. Thus, the EC/KBC 18 is provided with a signal line to connect to the SB 15 (to send a notification of SMI event occurrence to the CPU 11 via the SB 15). If a notification of SMI event occurrence is sent from the SB 15 to the CPU 11, the computer of the embodiment is designed to be able to rapidly determine whether or not an SMI event associated with the EC/KBC 18 has occurred as the system. This point will be discussed below in detail: An SMI processing section of BIOS determines the SMI cause. When the computer is started, the BIOS is loaded into the memory 13 from the BIOS-ROM 19 and is controlled by the CPU 11 for execution.

Figure 2:
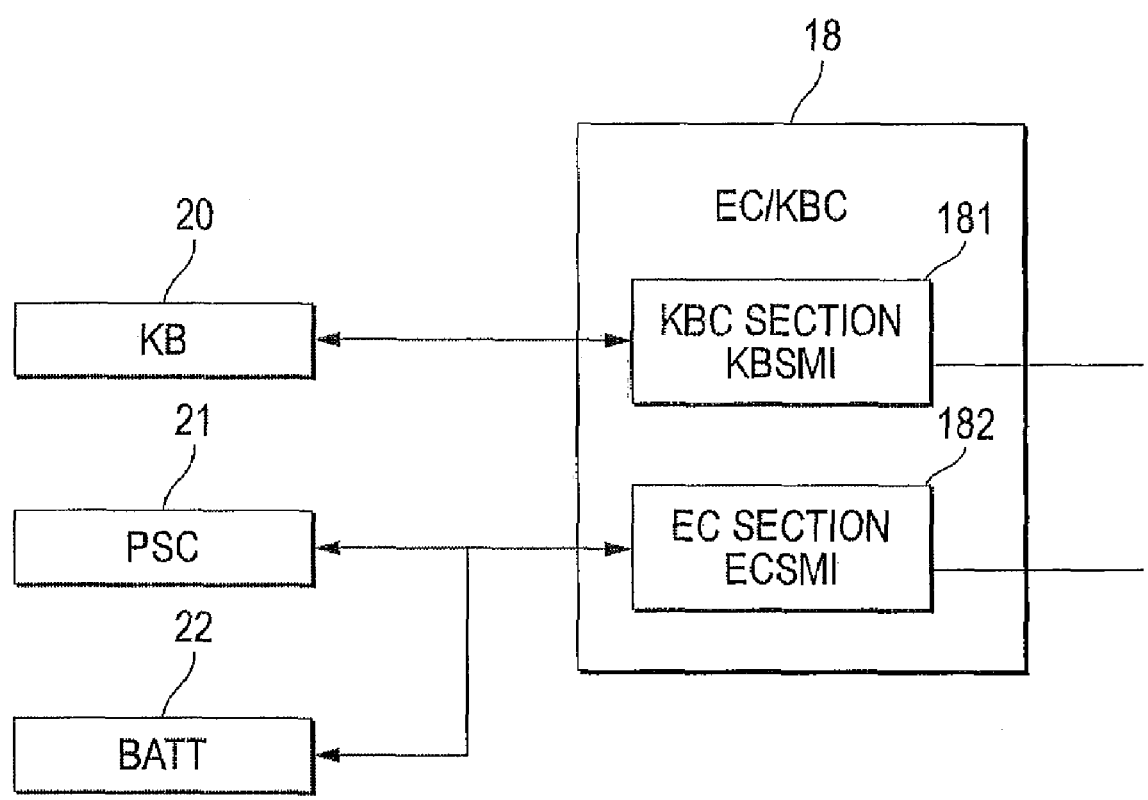
FIG. 2 is a block diagram to show the configuration of EC/KBC installed in the computer according to the embodiment of the invention.

FIG. 2 is a block diagram to show the configuration of the EC/KBC 18. As shown in FIG. 2, the EC/KBC 18 has a KBC section 181 and an EC section 182.

The KBC section 181 provides the function of transmitting user's operation of a KB (keyboard) 20 to the CPU 11. When the user presses a special key such as a function key of keys provided on the KB 20, the KBC section 181 outputs a KBSMI signal indicating occurrence of an SMI event to a dedicated signal line.

The EC section 182 provides a function of controlling a PSC (power supply control circuit) 21 and a BATT (battery) 22. For example, if the BATT 22 enters a low battery state, etc., the EC section 182 outputs an ECSMI signal indicating occurrence of an SMI event to a dedicated signal line.

Figure 3:
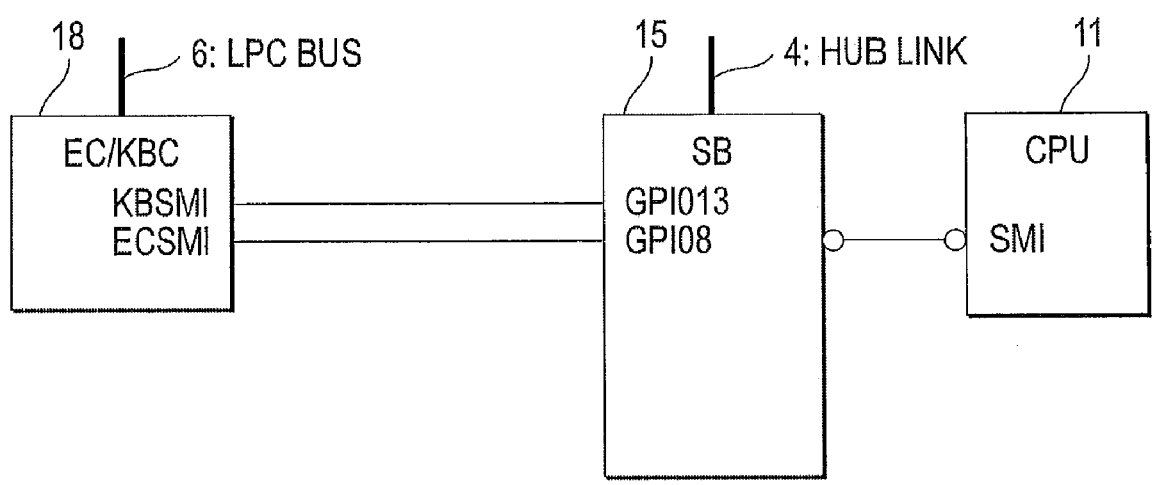
FIG. 3 is a drawing to show SMI event occurrence notification signal lines laid between the EC/KBC and an SB included in the computer according to the embodiment of the invention.

That is, from the EC/KBC 18, the signal line for SMI event occurrence notification is derived for each function that can become an SMI cause. These signal lines are introduced into the SB 15 as shown in FIG. 3. Upon reception of a notification of SMI event occurrence from at least one signal line, the SB 15 holds information indicating whether or not a KBSMI signal or an ECS signal is received in an internal register, and supplies an SMI signal to the CPU 11 (SMI assert). In the example in FIG. 3, the SB 15 holds information indicating the value of GPIO13 upon reception of a KBSMI signal and information indicating the value of GPIO8 upon reception of an ECS signal (can hold both the values, of course).

In the CPU 11 to which the SMI signal is supplied, the SMI processing section of the BIOS is started and determines the SMI cause. At this time, the SMI processing section of the BIOS accesses the SB 15 via the hub link 4 and checks whether or not the SB 15 causes an SMI event such as a timeout to occur, and also references the internal register of the SB 15 to check whether or not the KBC section 181 or the EC section 182 of the EC/KBC 18 makes an SMI event occurrence notification (whether or not information indicating the value of GPIO13 or GPIO8 is held).

That is, in the computer, whether or not an SMI event of each function of the EC/KBC 18 (multifunctional device) has occurred can be checked by accessing the SB 15 connected to the hub link 4 access to which is complete in about 50 ns without accessing the EC/KBC 18 connected to the LPC bus 6 it takes about 1 µs in accessing. Accessing the SB 15 is essentially required because the SB 15 can become an SMI cause. Thus, from the viewpoint from the SMI processing section of the BIOS, accessing the EC/KBC 18 via the LPC bus 6 is only deleted and additional access does not occur. Addition of a new device, etc., does not occur either from the viewpoint of the hardware. Thus, the computer makes it possible to enhance the responsivity of the SMI processing without the need for adding a new device, etc.

Checking whether or not an SMI event associated with the EC/KBC 18 has occurred is a necessary item each time an SMI signal is supplied to the CPU 11 regardless of whether or not the EC/KBC 18 is an SMI cause. Thus, if the responsivity of the SMI processing is enhanced, the responsivity of the whole system can be enhanced dramatically.

Figure 4:
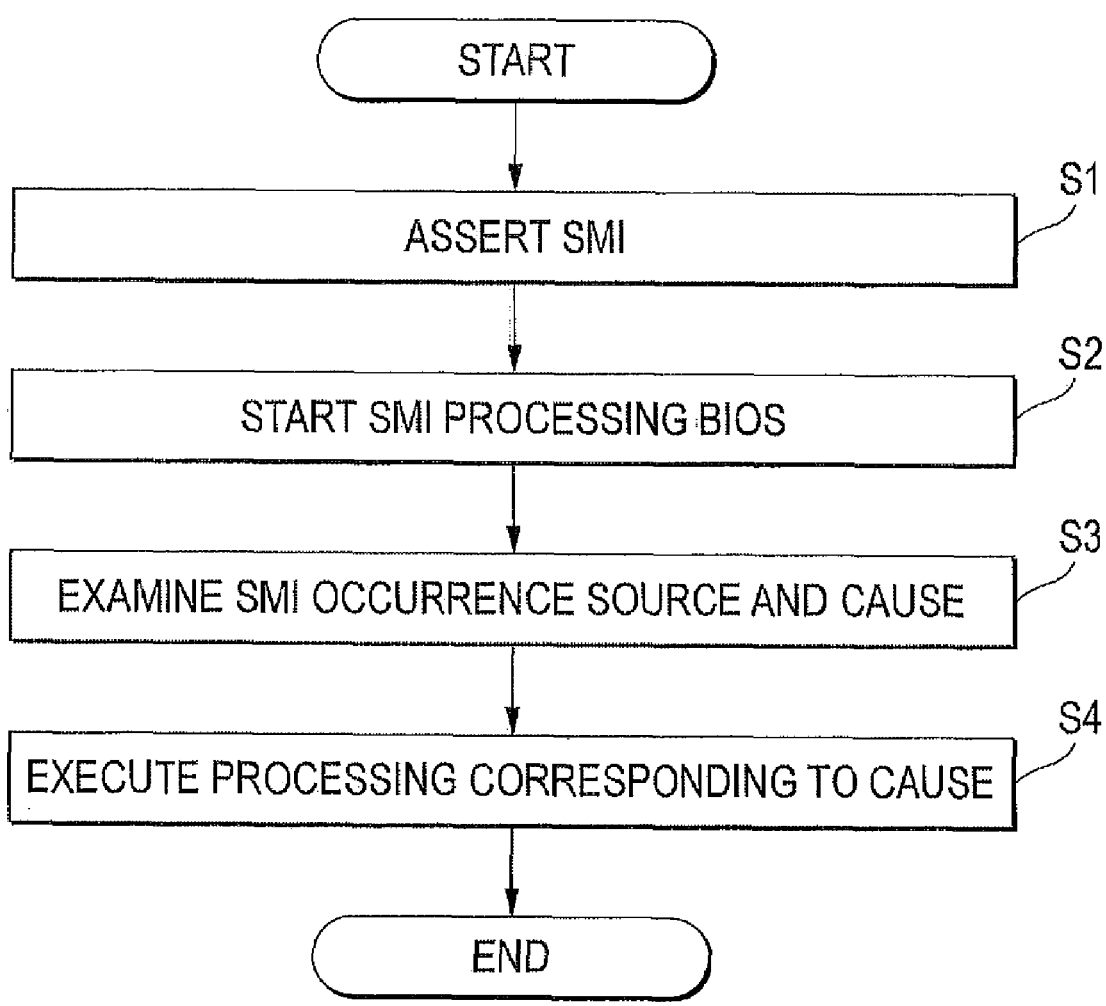
FIG. 4 is a flowchart to show the operation principle of SMI processing executed by the computer according to the embodiment of the invention.

Next, the operation principle of the SMI processing executed by the computer will be discussed with reference to FIG. 4.

When an SMI event occurs, an SMI signal is supplied from the SB 15 to the CPU 11 (step S1). Upon reception of the supplied SMI signal, the CPU 11 starts the SMI processing section of the BIOS (step S2).

On the other hand, the started SMI processing section of the BIOS first accesses the SB 15 via the Hub link 4 of the high-speed bus for checking the SMI cause (step S3). At this time, the SMI processing section of the BIOS also references the internal register of the SB 15 to check whether or not an SMI event of each function of the EC/KBC 18 (multifunctional device) connected to the LPC bus 6 of the low-speed bus has occurred. When the SMI processing section of the BIOS recognizes the SMI cause, it executes processing corresponding to the cause (step S4).

As described above, in the computer, the SMI event occurrence notification signal lines from the multifunctional device are provided in a one-to-one correspondence with the functions and are connected to the SB and whether or not an SMI event associated with the multifunctional device has occurred can be determined in the SB, so that the responsivity of the SMI processing can be enhanced.

It is to be understood that the invention is not limited to the specific embodiment described above and that the invention can be embodied with the components modified without departing from the spirit and scope of the invention. The invention can be embodied in various forms according to appropriate combinations of the components disclosed in the embodiment described above. For example, some components may be deleted from all components shown in the embodiment. Further, the components in different embodiments may be used appropriately in combination.

What is claimed is:

1. An information processing apparatus comprising:
   a CPU;
   a bridge circuit, comprising a north bridge portion and a south bridge portion, the bridge circuit connected to the CPU via a first bus, the bridge circuit including a signal transmission unit configured to supply a system management interrupt (SMI) signal to the CPU;
   a single multifunction device connected to the bridge circuit via a second bus, the single multifunction device having a plurality of functions each configured to cause an SMI event; and
   a register configured to store pieces of information, in which each piece of information corresponds to one of the plurality of functions and the information identifies a trigger function for the SMI event.

2. The information processing apparatus of claim 1, wherein the register is incorporated in the bridge circuit.

3. The information processing apparatus of claim 1, further comprising an SMI processing unit configured to acquire the information held in the register to determine whether the SMI event associated with the multifunction device occurs when the SMI signal is supplied from the bridge circuit to the CPU.

4. The information processing apparatus of claim 1, further comprising a plurality of signal lines provided between the bridge circuit and the multifunction device, each of the signal lines corresponding to one of the plurality of functions of the multifunction device and configured to send a notification of occurrence of an SMI event from the multifunctional device to the bridge circuit.

5. The information processing apparatus of claim 1, wherein the first bus operates at a higher communication speed than the second bus.

6. An information processing apparatus comprising:
   a CPU;
   a bridge circuit, comprising a north bridge portion and a south bridge portion, the bridge circuit connected to the CPU via a first bus, the bridge circuit including a signal transmission unit configured to supply a system management interrupt(SMI) signal to the CPU;
   a single multifunction device connected to the bridge circuit via a second bus, the single multifunction device having a plurality of functions each configured to cause an SMI event;
   a plurality of signal lines of the second bus provided between the bridge circuit and the multifunction device, each of the signal lines corresponding to one of the plurality of functions of the multifunction device and configured to send a notification of occurrence of the SMI event from the multifunction device to the bridge circuit; and
   wherein the bridge circuit includes a register that is configured to store pieces of information, in which each piece of information corresponds to one of the plurality of functions and the information identifies a trigger function for the SMI event.

7. The information processing apparatus of claim 6, further comprising an SMI processing unit configured to acquire the information held in the register to determine whether an SMI event associated with the multifunction device occurs when the SMI signal is supplied from the bridge circuit to the CPU.

8. The information processing apparatus of claim 6, wherein the first bus operates at a higher communication speed than the second bus.

9. An information processing apparatus comprising:
   a CPU;
   a bridge circuit, comprising a north bridge portion and a south bridge portion, the bridge circuit connected to the CPU via first bus, the bridge circuit including a signal transmission unit configured to supply a system management interrupt (SMI) signal to the CPU, the bridge circuit configured to cause a given SMI event;
   a single multifunction device connected to the bridge circuit via a second bus and a plurality of signal lines, the single multifunction device having a plurality of functions each configured to cause an SMI event; and
   a register configured to store pieces of information, in which each piece of information corresponds to one of the plurality of functions and the information identifies a trigger function for the SMI event.

10. The information processing apparatus of claim 9, further comprising:
    an SMI processing unit configured to access to the bridge circuit to determine whether the given SMI event is caused by the bridge circuit and to acquire the information held in the register to determine whether the SMI event associated with the multifunction device occurs when the SMI signal is supplied from the bridge circuit to the CPU.

11. The information processing apparatus of claim 9,
    wherein the plurality of signal lines are provided between the bridge circuit and the multifunction device; and
    each of the signal lines corresponds to one of the plurality of functions of the multifunction device and is configured to send a notification of occurrence of an SMI event from the multifunctional device to the bridge circuit.

12. The information processing apparatus of claim 9, wherein the register is incorporated in the bridge circuit.

13. The information processing apparatus of claim 9, wherein the first bust operates at a higher communication speed than the second bus.

14. An information processing apparatus comprising:
    a CPU;
    a bridge circuit, comprising a north bridge portion and a south bridge portion that are interconnected via a link bus, the north bridge portion of the bridge circuit being connected to the CPU via a first bus, the south bridge portion including a signal transmission unit configured to supply a system management interrupt (SMI) signal to the CPU;
    a single multifunction device connected to the south bridge portion of the bridge circuit via a second bus, the single multifunction device configured to perform a plurality of functions in which each of the functions are configured to initiate an SMI event and generate an SMI signal, the generated SMI signal being submitted to the north bridge portion via the link bus and reported to the CPU via the first bus; and
    a register configured to store pieces of information, in which each piece of information corresponds to one of the plurality of functions performed by the single multifunction device and each piece of information identifies a trigger function for the SMI event.

15. The information processing apparatus of claim 14, further comprising an SMI processing unit configured to acquire the information held in the register to determine whether the SMI event associated with the single multifunction device occurs when the SMI signal is supplied from the south bridge portion to the CPU.

16. The information processing apparatus of claim 14, further comprising a plurality of signal lines provided between the south bridge portion and the signal multifunction device, each of the signal lines corresponding to one of the plurality of functions of the single multifunction device and configured to send a notification of occurrence of an SMI event from the multifunctional device to the south bridge portion.

17. The information processing apparatus of claim 14, wherein the first bus operates at a higher communication speed than the second bus.

* * * * *